United States Patent [19]

Hibino

[11] 4,348,606
[45] Sep. 7, 1982

[54] POLYPHASE ARMATURE WINDINGS

[75] Inventor: Sadayoshi Hibino, Suzuka, Japan

[73] Assignee: Tokyo Shibaura Denki Kabushiki Kaisha, Kawasaki, Japan

[21] Appl. No.: 173,446

[22] Filed: Jul. 30, 1980

Related U.S. Application Data

[63] Continuation-in-part of Ser. No. 940,603, Sep. 8, 1978.

[51] Int. Cl.³ .............................................. H02K 3/00
[52] U.S. Cl. .................................... 310/184; 310/194
[58] Field of Search ........ 310/179, 180, 184, 198–208; 318/773–777

[56] References Cited

U.S. PATENT DOCUMENTS

| | | | |
|---|---|---|---|
| 2,217,460 | 10/1940 | Trassl | 310/202 |
| 2,414,571 | 1/1947 | Veinott | 310/198 |
| 3,325,661 | 6/1967 | Parsons | 310/179 |
| 3,794,870 | 2/1974 | Broadway | 318/773 |
| 3,927,358 | 12/1975 | Broadway | 318/773 |
| 3,949,253 | 4/1976 | Broadway et al. | 310/198 |
| 3,949,254 | 4/1976 | Woll et al. | 310/198 |
| 3,979,618 | 9/1976 | Auinger | 310/198 |
| 4,013,909 | 3/1977 | Broadway | 310/180 |
| 4,127,787 | 11/1978 | Auinger | 310/198 |
| 4,138,619 | 2/1979 | Broadway et al. | 310/198 |

OTHER PUBLICATIONS

Theory and Design of Small Induction Motors, by C. G. Veinott, published by McGraw-Hill Book Co., Inc., 1959, pp. 145–148.

The Nature of Polyphase Induction Machines, by P. L. Alger, Published by John Wiley & Sons, Inc., 1951, pp. 267–271.

Japanese Patent Disclosure No. 51-107409, "Windings of Polyphase Induction Motors", by Toshikichi Hatisuka, Tahashi Nati, published by *Japanese Patent Agent,* Sep. 24, 1976.

"Special Fractional-Slot Winding ($q\frac{1}{2}$) and Its Application" by Sadayoshi Hibino, Tetuya Hiramatu, Nobuo Takechi published by I.E.E. of Japan (Tokai Conference, 9/1977).

*Primary Examiner*—R. Skudy
*Attorney, Agent, or Firm*—Oblon, Fisher, Spivak, McClelland & Maier

[57] ABSTRACT

An armature winding for a three-phase induction motor is provided with slots in each of which are placed windings having a double-layer structure. The number of slots, q per pole per phase is: $q = z/(3 \times P)$, and q is less than $\frac{1}{2}$, where z denotes the number of slots of the stator, and P the number of poles. The number of coils, Q, per phase is: $Q = z/3$. The coils constitute real poles of the same polarity, the number of which is also Q, and further provide one or more imaginary poles between the real poles. The coils are connected in such a way that the voltage vector of each phase is completely balanced.

2 Claims, 5 Drawing Figures

POLYPHASE ARMATURE WINDINGS

This is a continuation-in-part of application Ser. No. 940,603 filed on Sept. 8, 1978.

BACKGROUND OF THE INVENTION

This invention relates to an improvement of a multipole armature winding of a polyphase dynamo-electric machine such as an induction motor.

In a prior art armature winding, where the number of slots q per pole per phase is larger than 1, the following relationship holds:

$$P = z/(m \times q) \ldots \quad (1)$$

where P represents the number of poles, z the number of slots, and m the number of phases.

Accordingly, where the number of slots z is constant, in order to maximize the number of poles it is necessary to make minimum the product of the number of phases m and the number of slots q, per pole, per phase. Since the number of phases m is constant, it is possible to maximize the number of poles P by making 1 the number of slots q, per pole per phase. In this case, all magnetic poles formed by this coil are real poles and the number of coils per phase is equal to the number of poles P.

Some of the prior art armature windings were wound to change the connection so as to change the number of poles thus producing two speeds. In this case, the number of poles P becomes a maximum when the number of slots q, per pole per phase is selected to be equal to 0.5.

In a winding in which the number of slots q, per pole per phase is 0.5 where Q coils are connected to form poles of the same polarity there is a design wherein real poles formed by the coils and apparent or imaginary poles, also known as consequent poles, intermediate of the real poles alternate regularly so that where the number of coils Q per phase is equal to z/m and the number of poles is equal to twice of the number of coils Q per phase. FIG. 1 shows this coil arrangement in which Arabic numerals show slot numbers, letter a the upper coil of phase I, a' the lower coil of phase I, b and b' the upper and lower coils of phase II, and c and c' the upper and lower coils of phase III.

The voltage vectors of this winding have 120° phase difference as shown in FIG. 2.

With the winding in which the real poles and the imaginary poles alternate regularly, the maximum number of poles is at most 2 times Q (in the example shown in FIG. 1, 24). For this reason, it has been desired to develop an improved armature winding that can increase the number of poles while maintaining the number of slots at a constant value.

SUMMARY OF THE INVENTION

It is the object of this invention to provide an improved armature winding that can fulfill this requirement.

Another object of this invention is to provide an improved armature winding capable of increasing the number of poles for a definite number of slots.

According to this invention, there is provided a polyphase armature winding wherein the number of slots per pole per phase is less than 0.5 and the coils are disposed in respective slots such that there are formed one or more imaginary poles, also known as consequent poles between adjacent real poles, and that the voltage vectors of respective phases completely balance with each other.

DESCRIPTION OF THE PREFERRED EMBODIMENT

Figures 1, 2:
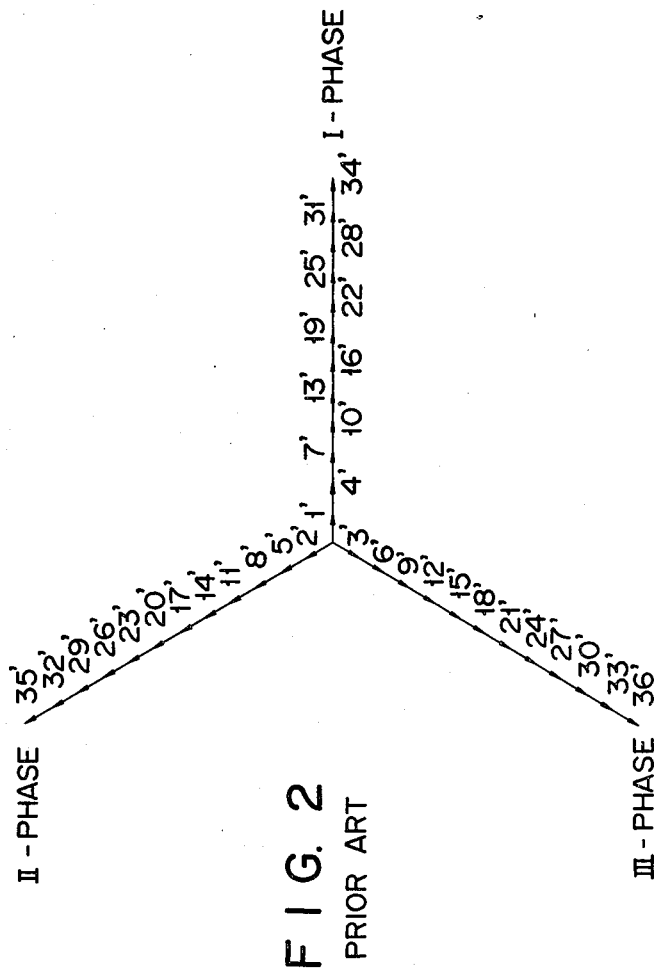
FIG. 1 is a diagrammatic representation of a prior art coil arrangement.
FIG. 2 shows the voltage vectors of respective phases shown in FIG. 1.
Figures 3, 4:
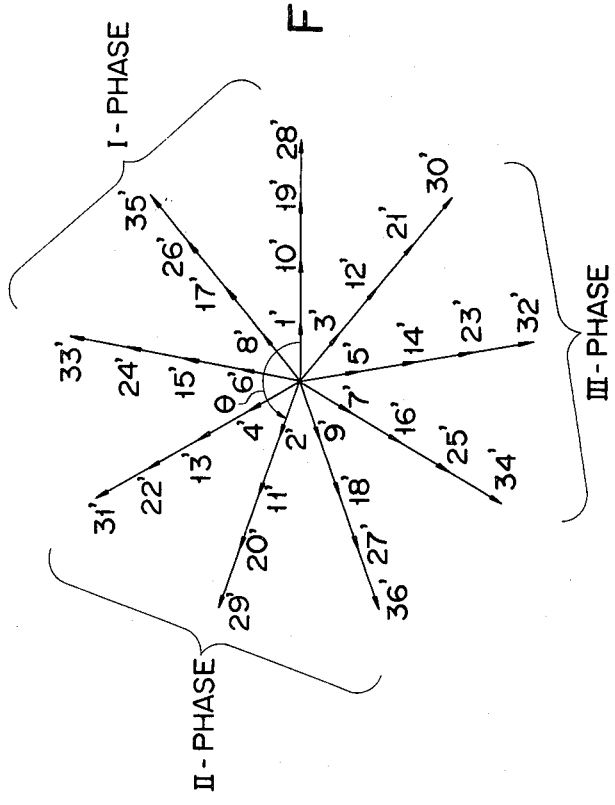
FIG. 3 is a diagrammatic representation of the coil arrangement of one embodiment of this invention.
FIG. 4 shows a voltage vector diagram of respective phases of the coil shown in FIG. 3.
Figure 5:
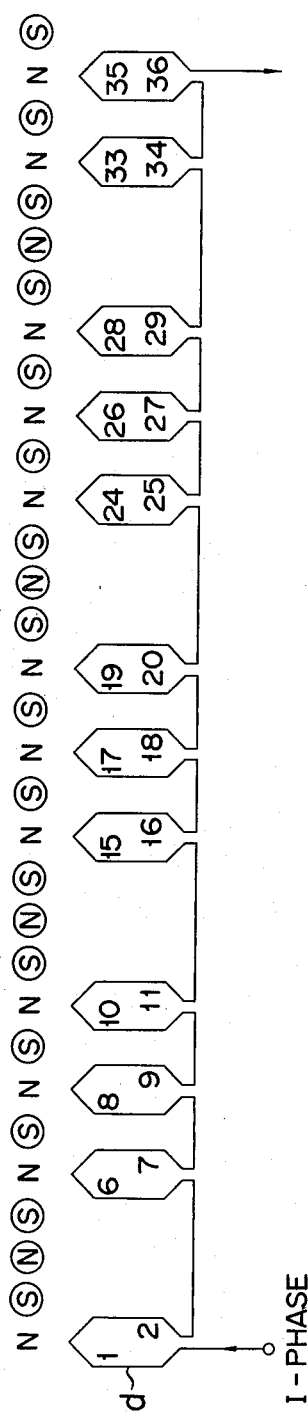
FIG. 5 shows the pole arrangement of phase I shown in FIG. 3.

Before describing the invention with reference to FIGS. 3, 4 and 5, a condition under which the fundamented voltages of respective phases balance with each other will be considered. There is a following relationship $$\theta = 180/z \times P \quad \ldots (2)$$

where $\theta$ represents the phase difference (in electrical angle) between adjacent coils.

Denoting the voltages of respective coils by, $e_1$, $e_2$, $e_3 \ldots e_z$ respectively, the vector sum $\dot{v}$ of these voltages is given by the following equation:

$$\dot{v} = e_1 + e_2 j^\theta e_3 j^{2\theta} + \ldots e_z j^{(z-1)\theta} \quad \ldots (3)$$

In equation (3), by making $\dot{v}=0$, a balance is obtained.

Where the voltages of respective coils are equal, and where the number of slots q, per pole per phase is less than 1, in an equation $q=a/b$ (a<b) balance m phase winding can be obtained if there is no greatest common divisor of 3 or larger than 3 between the denominators b and 2 m.

For example, where the number of slots z=36, the number of phases m=3, the number of poles P=32, phase difference between adjacent coils $\theta=160°$ and the pitch between the first and second coils is equal to 88.9%, the coil arrangement is shown by FIG. 3. As shown, the upper coil a of phase I is contained in slots 1-6-8-10-15-17-19-24-26-28-33-35 whereas the lower coil a of the same phase is contained in slots 2-7-9-11-16-18-20-25-27-29-34-36. In the same manner, the upper coil b of phase II is contained in slots 2-4-9-11-13-18-20-22-27-29-31-36, the lower coil b' is contained in slots 1-3-5-10-12-14-19-21-23-28-30-32, the upper coil c of phase III is contained in slots 3-5-7-12-14-16-21-23-25-30-32-34 and the lower coil c' is contained in the slots 4-6-8-13-15-17-22-24-26-31-33-35. Since in this case q=⅜ and there is no greatest common divisor of 3 or larger than 3 between the denominators 8 and 6 (since the number of phases is 3, 2×3=6) a balanced three phase winding can be obtained. Of course current flows in the opposite directions through the upper and lower coils.

FIG. 4 shows voltage vectors of phases I, II and III in which 1' shows the voltage vector of the coil contained in slot 1, and 2', 3' ... 36' show voltage vectors of the coils contained in slots 2 through 36 respectively. Since the voltage vector of each phase comprises three vectors which are dephased 40° from each other the actual voltage vector of each phase is a resultant of the three vectors.

FIG. 5 shows, the pole arrangement of phase I where the coils are arranged as shown in FIG. 3 in which d represents coils, N represents the N poles of the real poles, Ⓝ represents the N poles of the imaginary poles and Ⓢ represents the S poles of the imaginary poles. As can be noted from FIG. 5 between adjacent real poles N, there are formed one or more imaginary poles. In a prior art construction, in a case wherein the number of slots is 36 and the number of phases is 3, the maximum number of poles is 24, that is 2×Q, whereas according to the arrangement shown in FIG. 5, it is possible to provide larger number of poles. For this reason, it is possible to increase the type of windings for a definite number of slots, thus reducing the types of slot punches. Moreover, it is possible to manufacture multiple-pole windings (several ten poles) by using the design of standard motor having a relatively small number of poles, for example 4 or 6, without designing a motor having a special number of slots.

The coil arrangement shown in FIG. 3 can be obtained by dividing the voltage vector shown in FIG. 4 into three equal portions (this means 3 phases) and disposing them in respective slots such that the portion from 0 up to $\frac{2}{3}\pi$ (exclusive of $\frac{2}{3}\pi 0$ comprises phase I, the portion from $\frac{2}{3}\pi$ up to $(4/3)\pi$ (exclusive of $(4/3)\pi$) comprises phase II and the portion from $(4/3)\pi$ up to $2\pi$ (exclusive of $2\pi$) comprises phase III.

In a case shown in FIG. 3 wherein the number of slots is 36, and the number of poles is 32, the coil arrangement is I-II-III-II-III-I-III-I-II ..., whereas in the case wherein the number of slots is 36 and the number of poles is 30, the coil arrangement is I-II-III-I-III-I-II-III-II-III-I-II .... In a case wherein the number of poles is 28, the coil arrangement is I-II-III-I-II-III-II-III-I-II-III-I-II .... In this manner, the arrangement differs depending upon the number of poles. In a case wherein the number of slots is 24 and the number of poles is 20, the coil arrangement is I-II-III-I-III-I-II-III-II-III-I-III . ... It should be understood that other number of slots can also be used.

Furthermore, even when the number of slots q, per pole per phase is larger than 1, it is not necessary to change the coil arrangement for each pole in the same manner when q=0.5.

As above described, according to this invention the coils are arranged such that there are formed one or more imaginary poles between adjacent real poles and that the voltage vectors of respective phases balance with each other, so that it is possible to provide a polyphase armature winding capable of increasing the number of poles than the prior art design for a definite number of slots.

What is claimed as new and desired to be secured by Letters Patent of the United States is:

1. An armature winding for a three-phase induction motor, said winding being of a double-layer structure of a plurality of coils placed in a plurality of slots provided in a stator core thereby forming a plurality of poles, wherein:

the number of slots (q) per pole per phase is less than $\frac{1}{2}$, said number of slots per pole per phase being represented as $z/3 \times P$ where z denotes the number of slots in said stator core and P represents the number of poles;

the number of coils (Q) per phase is equal to the number of slots divided by 3, said coils being inserted in said slots and connected in such a manner that the voltage vector of each phase is completely balanced;

whereby at least one consequent pole occurs between the real poles.

2. An armature winding for a three-phase induction motor, said winding being of a double-layer structure of a plurality of coils placed in a plurality of slots provided in a stator core thereby forming a plurality of poles, wherein:

the number of slots (q) per pole per phase is less than $\frac{1}{2}$, said number of slots per pole per phase bring represented as $z/3 \times P$ where z denotes the number of slots in said stator core and P represents the number of poles, said poles being selected such that no common denominator of 3 or larger exists between the quantity $(3 \times P)$ and the number 6;

the number of coils (Q) per phase is equal to the number of slots divided by 3, said coils being inserted in said slots and connected in such a manner that the voltage vector of each phase is completely balanced;

whereby at least one consequent pole occurs between the real poles.

* * * * *